UNITED STATES PATENT OFFICE.

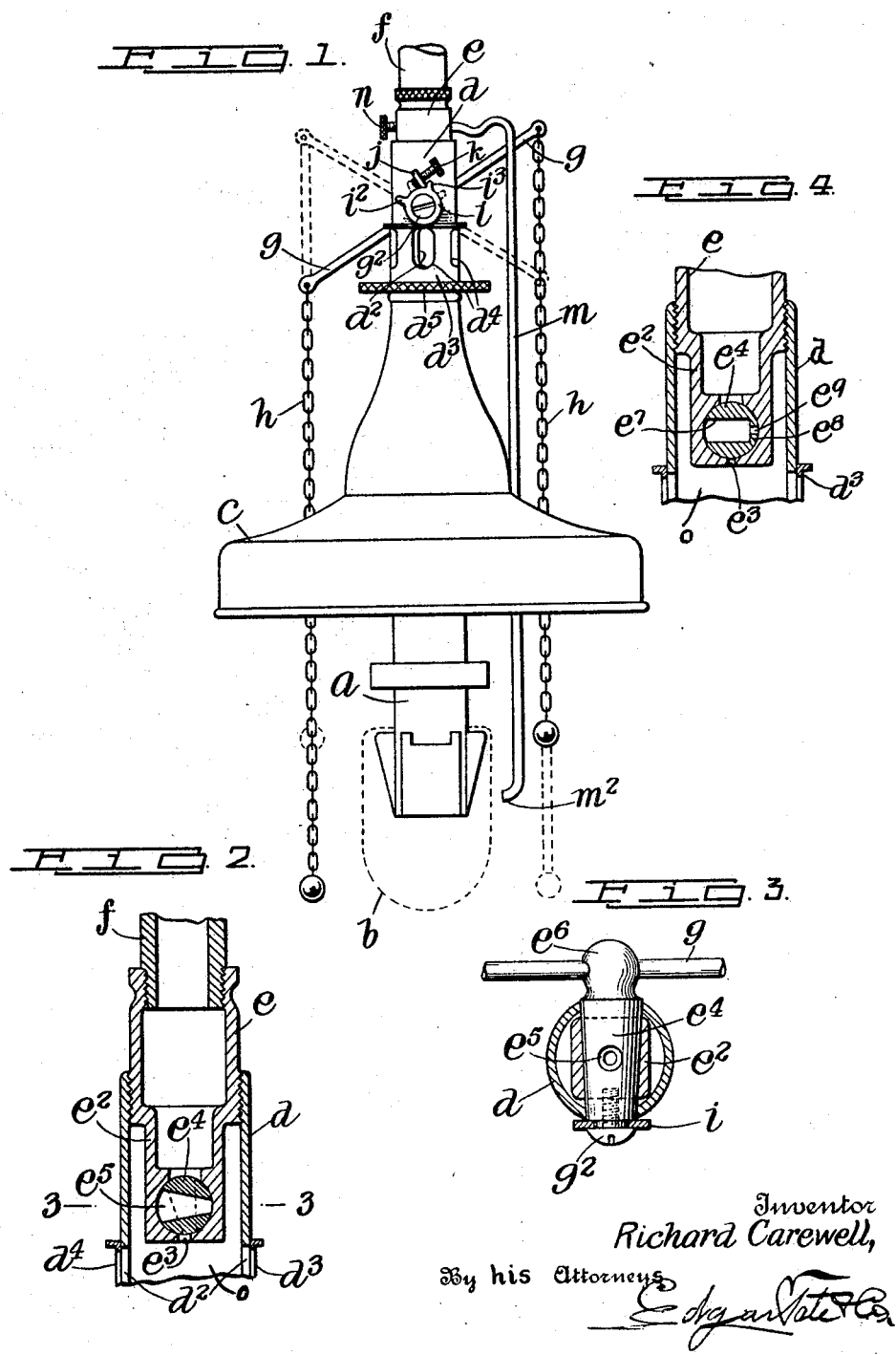

RICHARD CAREWELL, OF BROOKLYN, NEW YORK.

GAS SUPPLY AND REGULATING VALVE FOR INVERTED GAS-BURNERS.

1,286,937.  Specification of Letters Patent.  Patented Dec. 10, 1918.

Application filed January 15, 1917. Serial No. 142,379.

*To all whom it may concern:*

Be it known that I, RICHARD CAREWELL, a citizen of the United States, and residing at Brooklyn, in the county of Kings and State of New York, have invented certain new and useful Improvements in Gas Supply and Regulating Valves for Inverted Gas-Burners, of which the following is a specification, such as will enable those skilled in the art to which it appertains to make and use the same.

This invention relates to what are known as inverted gas burners or regenerative gas burners in which the gas is heated before being burned and in which an incandescing mantle is employed, and the object thereof is to provide improved means for regulating the supply of gas to burners of this class whereby the supply may be regulated without causing the burner to smoke.

The invention is fully disclosed in the following specification, of which the accompanying drawing forms a part, in which the separate parts of my improvement are designated by suitable reference characters in each of the views, and in which:—

Figure 1 is a side view of a burner of the class specified provided with my improvement;

Fig. 2 a vertical sectional detail thereof and showing the valve, in cross section;

Fig. 3 a partial horizontal sectional view on the line 3—3 of Fig. 2; and,

Fig. 4 a modification of the construction shown in Fig. 2.

In the drawing forming part of this specification, I have shown at $a$ a burner of the class specified in which the incandescing mantle $b$ is indicated in dotted lines, and the burner is provided with the usual canopy or shade $c$, and is connected with the usual pipe $d$ in the bottom portion of which are formed slots $d^2$, and on the bottom portion of the pipe $d$ is placed the usual rotatable sleeve $d^3$ having slots $d^4$ and provided with a milled collar $d^5$ by which it may be rotated and this construction forms the usual air register device for burners of this class.

In connection with the pipe $d$, I employ a tubular coupling $e$ which is screwed into the pipe $d$ and provided at its lower end with a reduced extension $e^2$ having, in its lower end portion, an axial gas port or passage $e^3$ controlled by a valve $e^4$, and the valve $e^4$ is provided with a transverse port $e^5$ which is tapered as shown in Fig. 2, or larger at one end than at the other, and the upper end of the port $e^3$ is also larger than the lower end thereof.

The coupling $e$ is screwed onto the main gas supply $f$ in the usual manner, and the larger end of the valve $e^4$ is provided with a head $e^6$ through which is passed an arm $g$, the end portions of which are of equal length and provided with suspended chains or other flexible devices $h$.

The smaller end of the valve $e^4$ is provided with a disk or collar $i$ held in place by a screw $g^2$ passed therethrough and into the valve, and said collar or disk is provided with two projecting teeth $i^2$ and $i^3$ separated by an arc of approximately ninety degrees, and the pipe $d$ is provided with a lug or projection $j$ through which is passed a set screw $k$, and the set screw $k$ operates in connection with the tooth $i^2$ while the tooth $i^3$ operates in connection with the lug or projection $j$ to limit the rotation of the valve $e^4$, and said valve is operated by the arm $g$ in the usual manner.

Lamps or burners of the class under consideration are usually provided with two valves one serving as a regulator and the other as a full supply and cut-off, and this construction forms between said valves a gas chamber and the variation of gas pressure in the operation of the said valves causes the burner to smoke at times and one of the objects of this improvement is to overcome this objection, and the operation of the improved construction herein described will be readily understood from the foregoing description when taken in connection with the accompanying drawing and the following statement thereof.

The position of the valve and the disk or collar $i$ as shown in Fig. 1 is the closed position, as indicated in Fig. 2, and by drawing the chain $h$ to the left downwardly into the position indicated in dotted lines, which operation moves the arm $g$ into the position shown in dotted lines, the valve $e^4$ will be rotated as well as the disk or collar $i$ and the projecting tooth $i^2$ will strike the end of the screw $k$ which limits the movement of said valve and, in Fig. 2, I have indicated in dotted lines the position of the port $e^5$ in said valve, which corresponds with the position of the disk or collar $i$, as indicated in dotted lines in Fig. 1.

It will be understood that the screw $k$ may be withdrawn to fully open the port $e^5$ in the valve $e^4$, or said screw may be manipulated to decrease the size of the opening of the port $e^5$ in connection with the port $e^3$ in the reduced extension $e^2$ of the coupling $e$.

In Fig. 1 of the drawing I have shown the usual pilot light pipe $m$ which is connected with the tubular coupling $e$ and passes downwardly and the end $m^2$ thereof communicates with the burner, or the incandescing mantle $b$ in the usual manner and passed through the coupling $e$ on the opposite side of the connection of the pipe $m$ therewith is the usual adjusting screw $n$ which operates in connection with said pilot pipe $m$ to govern the supply of gas through said pipe. This construction is shown in Fig. 1 only for the reason that the said pilot light forms no part of my invention more than in the fact that my improved valve mechanism is particularly designed for burners employing the pilot light attachment, but it will be understood that my invention is not necessarily limited to this feature nor to the specific means for governing the movements of the valve $e^4$ in one direction to increase or decrease the size of the port or passage $e^5$.

The parts $e$ and $d$ form an air and gas mixing chamber $o$ into which the gas is discharged and in which the gas and air are mingled in the usual manner, and in Fig. 4 I have shown another form of construction in which the valve $e^4$ instead of being provided with a transverse and tapered port or passage is provided with a large cylindrical port or passage $e^7$, the discharge end of which is closed by a thin web $e^8$ in which is a supplemental port or passage $e^9$ which is adapted to register with the port or passage $e^3$, and the port or passage $e^9$ is of greater dimensions than the port or passage $e^3$ and with this construction of the valve, and with that shown in Figs. 2 and 3, the gas will be discharged in a direct line centrally through the port or passage and not in a flaring or lateral direction, and this will prevent wavering or flickering of the flame of the burner.

Having fully described my invention, what I claim as new and desire to secure by Letters Patent, is:—

1. In a device of the class described, a pipe coupling provided with a reduced extension having an axial port, a pipe screwed onto said coupling and inclosing the reduced extension thereof, a valve passed through said pipe and through the extension of said coupling and adapted to control said port, said valve being provided at one end with a transverse arm and at the other end with a collar having spaced projecting teeth, and said pipe being provided adjacent to said collar with a lug or projection in connection with which one of said teeth operates, and a set screw passed through said lug or projection and adapted to operate in connection with the other of said teeth.

2. In a device of the class described, a pipe coupling provided with a reduced extension having an axial port, a pipe screwed onto said coupling and inclosing the reduced extension thereof, a valve passed through said pipe and through the extension of said coupling and adapted to control said port, said valve being provided at one end with a transverse arm and at the other end with a collar having spaced projecting teeth, and said pipe being provided adjacent to said collar with a lug or projection in connection with which one of said teeth operates, and a set screw passed through said lug or projection and adapted to operate in connection with the other of said teeth, said valve being provided with a transverse port which is larger at one end than at the other and the port in the extension of the pipe coupling being also larger at one end than at the other.

3. In a device of the class described, a gas supply pipe the lower end of which is inclosed in a supplemental pipe provided with an air register device and within which is a mixing chamber, said lower end of the first named pipe being provided with an axial port the outlet of which is smaller than the inlet, a valve passed transversely through the said lower end of the first named pipe closely adjacent to the outlet of the axial port and spacing the inlet of said axial port from the outlet and through which gas is discharged into the mixing member, said valve being provided with a transverse port or passage the discharge end of which is closed by a thin web having a small port adapted to register with the outlet of the axial port for guiding gas centrally to the mixing chamber, and the outlet of the port or passage in the valve being larger than the outlet of said axial port or passage into the mixing chamber.

In testimony that I claim the foregoing as my invention I have signed my name in presence of the subscribing witnesses this 13th day of January 1917.

RICHARD CAREWELL.

Witnesses:
C. E. MULREANY,
N. E. THOMPSON.